United States Patent [19]

Shedd et al.

[11] Patent Number: 4,574,518

[45] Date of Patent: * Mar. 11, 1986

[54] FISHING CLIP

[75] Inventors: William D. Shedd, Mission Viejo; Robert C. Eschbach, Newport Beach, both of Calif.

[73] Assignee: AFTCO Mfg. Co., Inc., Irvine, Calif.

[*] Notice: The portion of the term of this patent subsequent to Jan. 31, 2001 has been disclaimed.

[21] Appl. No.: 559,342

[22] Filed: Dec. 8, 1983

Related U.S. Application Data

[63] Continuation-in-part of Ser. No. 299,713, Sep. 8, 1981, Pat. No. 4,428,142.

[51] Int. Cl.[4] .............................................. A01K 91/00
[52] U.S. Cl. ................................. 43/43.12; 43/47.04; 43/44.88; 43/43.1
[58] Field of Search ............... 43/43.1, 43.12, 42.04, 43/44.88; 24/132 WL, 132 R, 242, 232, 506, 507, 588; 294/83 R; 254/411, 390; 242/157 R

[56] References Cited

U.S. PATENT DOCUMENTS

| Re. 25,650 | 10/1964 | Strumpf | 43/43.12 |
|---|---|---|---|
| 1,067,116 | 7/1913 | Hukill | 254/390 |
| 1,503,713 | 8/1924 | Sanders | 242/157 R |
| 1,635,145 | 7/1927 | Taylor | 254/390 |
| 3,015,513 | 1/1962 | Ewing | 294/83 |
| 3,077,048 | 2/1963 | Strumpf | 43/43.12 |
| 3,342,442 | 9/1967 | Brantingson | 242/84.2 G |
| 3,629,908 | 12/1971 | Phillips | 24/115 F |
| 3,905,148 | 4/1975 | Naone | 43/43.12 |
| 3,919,801 | 11/1975 | Bart | 43/43.12 |
| 3,930,330 | 1/1976 | Black | 43/17 |
| 4,069,611 | 1/1978 | Dusich et al. | 43/43.12 |
| 4,173,091 | 11/1979 | Emory | 43/43.12 |
| 4,428,142 | 1/1984 | Shedd | 43/43.12 |

Primary Examiner—Nicholas P. Godici
Assistant Examiner—C. McKee
Attorney, Agent, or Firm—Gausewitz, Carr & Rothenberg

[57] ABSTRACT

An outrigger or downrigger fishing clip comprises a U-shaped arm pivoted to a body to define a cavity between the arm and body in which is positioned a roller journaled in the arm so that a fishing line extending through the clip between the arm and body rides friction-free over the roller. Shrouds extend from the body over the roller ends to prevent a line from slipping over the ends of the roller and getting caught between the roller ends and the pivoted arm. A latch link spans the arm and body, extending through outwardly opening mating recesses in the arm and body and has a cam element engaging the free end of the roller of the shaft. The latch link is resiliently pressed against the body within the recess to provide a selectively adjustable force that resists pivotal release of the arm and of the tensioned fishing line entrained over the roller.

6 Claims, 5 Drawing Figures

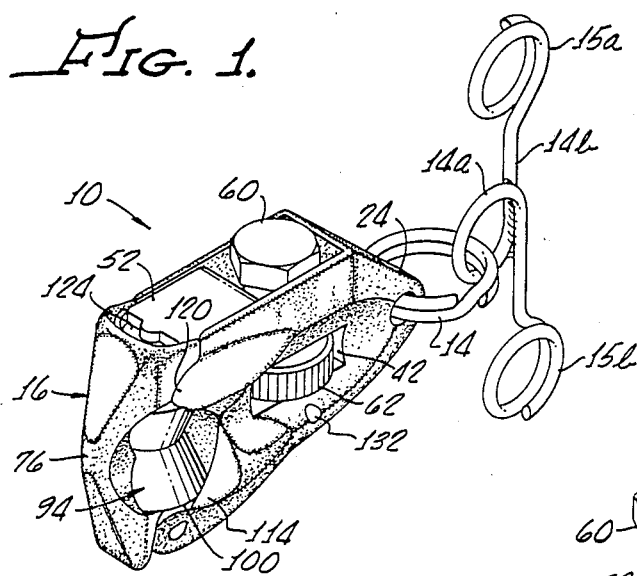
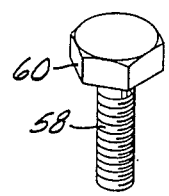
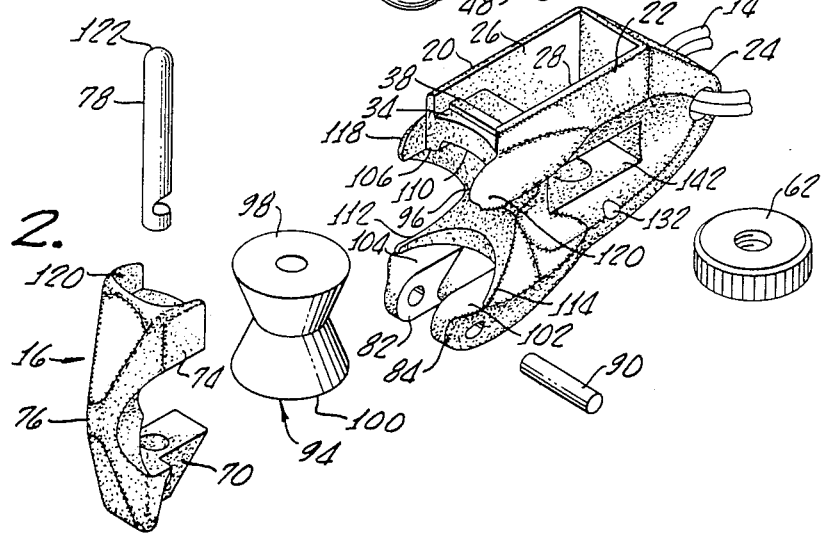

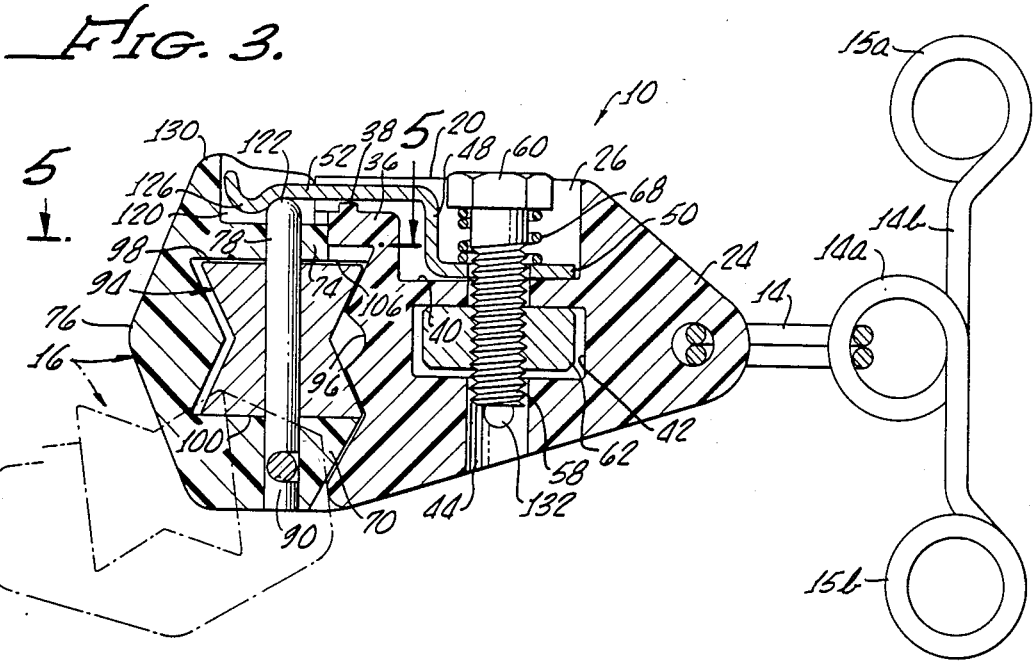
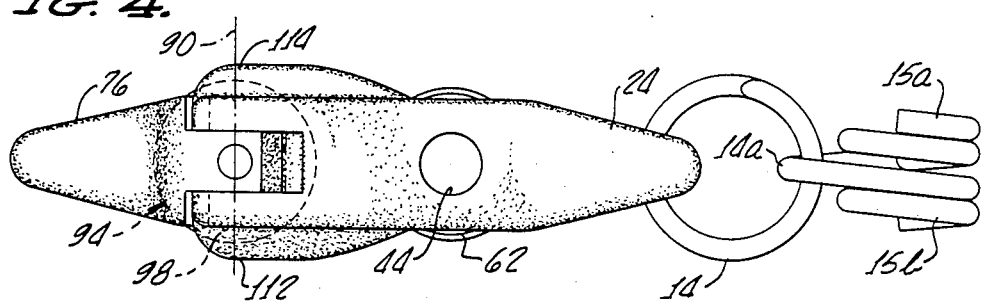
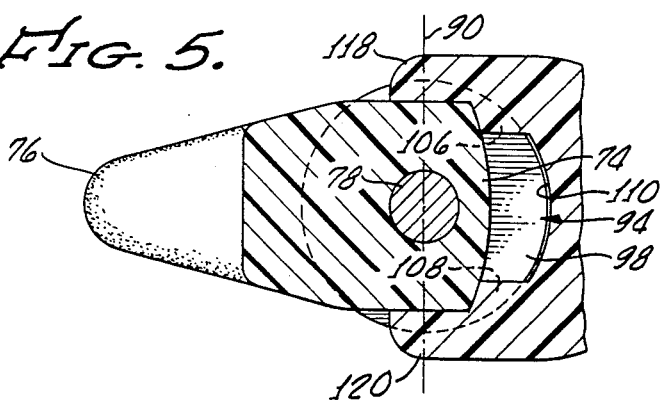

FISHING CLIP

The present application is a continuation-in-part application of our application for Outrigger Fishing Clip filed Sept. 8, 1981, Ser. No. 299,713.

BACKGROUND OF THE INVENTION

The present invention relates to releasable fishing line clips and more particularly concerns an improved snag-free outrigger or downrigger clip of a compact arrangement, having increased efficiency, decreased line friction and improved latching.

In various types of trolling, the fishing line is held at a position to one side of, or below, a cruising boat by means of an outrigger or downrigger. The line is releasably held at the outwardly or downwardly displaced position by being passed through a clip secured to a support, such as an outrigger pole or a weighted downwardly extending line. The clip is arranged so that when a fish strikes the bait or lure, the line tension increases sufficiently to free the line from the clip.

Because the clip is displaced from the cruising boat, the fishing line passing through the clip makes a sharp bend, generally being led over a releasable member, such as a wire or bail, that is pivoted to the clip and pulled outwardly by a sudden tension increase so as to allow the line to run freely out on the clip. Many releasable clips presently available create excessive friction between the fishing line and the wire or bail over which it runs so that the line frequently is seriously damaged or frayed.

An arrangement that attempts to decrease this friction is described in the U.S. Pat. No. 3,905,148, to Naone et al which shows a circular sheave with fixed axial protuberances. These protuberances are frictionally received and clamped between a pair of legs that are adjusted to maintain the sheave in position. The clamping force needed to hold the sheave in position exerts a rotation restraining frictional force on the sheave which thus may experience difficulties in turning and the concomitant loss of a friction-free characteristic. Further, with the arrangement of Naone et al, the increased tension on a line to release the line from the clip will pull the sheave completely free of its supporting legs as the line is released. Thus, the sheave is lost each time there is a strike, and a new sheave must be employed for reuse of the clip. Obviously, economic considerations will prevent this disposable and expendable sheave from being manufactured with optimum characteristics of efficiency, durability, and frictionless rotation.

The clip of our prior application, identified above, includes an all-plastic latch member which overlies both the body and the pivoted arm and may be subject to wear and inadvertent release or displacement. Tension of the trolling line varies as the lure skips in and out of the water, so that under some circumstances a very small diameter or compressible line, such as a Dacron line, may slip over the end of the roller of the clip of our prior application and become jammed between the end surface of the roller and the roller mounting arm. The clip described in the present application minimizes or avoids such problems and provides an improved, more efficient, and compact design having significant advantages over the invention of our earlier application.

SUMMARY OF THE INVENTION

In carrying out principles of the present invention in accordance with a preferred embodiment thereof, a releasable roller clip has a releasable arm pivoted to the clip body for movement between a first position in which the arm is spaced from the body to define a line receiving cavity closed at opposite ends of the arm and a second position in which one end of the arm is displaced from the body. A roller is journaled to the arm so that force exerted by a tensioned line extending over the roller through the cavity tends to pivot the arm and roller away from the body. Shrouds extend from the body over the roller ends to prevent a line from slipping over the roller ends and becoming jammed between the roller ends and the arm. Latching means for retaining the arm in its operative position includes a recess formed in an outer end of the body and opening outwardly and forwardly toward the arm, and a latch link in the recess having a latch end extending from the recess beyond the body and toward the arm, the latch being pivoted to the body within the recess. Means for resiliently pressing the latch link into the recess and interengaging cam means on the arm and on the latch releasably attach the arm to the latch link with a selectively adjustable force.

BRIEF DESCRIPTION OF THE DRAWINGS

FIG. 1 is a perspective view of a releasable roller clip embodying principles of the present invention;

FIG. 2 is an exploded pictorial view of the parts of the clip of FIG. 1;

FIG. 3 is a cross section of a clip of FIG. 1, showing the roller and pivoted arm in open position in dotted lines;

FIG. 4 is a view of the bottom of a clip; and

FIG. 5 is a fragmentary section taken on lines 5—5 of FIG. 3 showing details of upper anti-jam shrouds.

A presently preferred embodiment of the present invention comprises a clip body 10 that can be secured to a suitable support such as an outrigger or downrigger line (not shown) by means of a ring 14. Ring 14 freely engages an intermediate loop 14a fixed to a rod 14b having rings 15a and 15b through which an outrigger or downrigger line (not shown) may be threaded. Thus the body 10 is freely pivotal relative to the outrigger or downrigger line about two different axes. A pivoted arm 16 is releasably held to the body by a latch line 18 that spans the body and one end of the arm 16. Body 10 is of generally triangular configuration, tapering rearwardly to a smaller end to which the retaining ring 14 is secured. The body includes flat parallel upper side portions 20 and 22 terminating in a rearwardly tapering end portion 24 which tapers both horizontally and vertically (when the clip body is oriented as shown in FIG. 1) toward the ring 14. The upper edge of the body between parallel walls 20 and 22 is formed with a recess defined by the inner sides 26 and 28 of the sidewalls 20 and 22. The recess opens upwardly and outwardly to the top edge of the body and opens forwardly to a front edge of the body. The forward opening of the recess is partially closed by a front wall 34 having an upwardly projecting latch link stop 38 thereon. Preferably the bottom 40 of the recess (FIG. 3) slopes forwardly and downwardly for reasons to be described below.

An aperture 42 of substantially rectangular cross section extends entirely through the body from side to side thereof and a vertical bore 44 extends through the body into the aperture 42.

The angulated, substantially Z-shaped latch link 18 includes a first leg within the recess having an intermediate portion 48 extending substantially downwardly toward the bottom of the recess at the front thereof along front wall 34 and an inner leg portion 50 extending substantially along the bottom of the recess rearwardly from the intermediate portion 48. The angulated latch link includes a leg 52 projecting forwardly from the front portion of the body 10, extending from the recess between side walls 20 and 22 and beyond the body toward the pivoted arm 16.

A bolt 58 having an hexagonal head 60 extends through an aperture in the inner leg portion 50 of the latch link, through the aperture 42 and at least partly into the bore 44. A knurled thumb nut 62 is captured within the aperture 42 and threadedly engages the threaded shank of the bolt. A compression spring 68 surrounds the shank and is interposed between the bolt head 60 and the latch link leg portion 50 to thereby press the latch link downwardly into the body recess. The lower edge of the rearmost end of inner latch link portion 50 is fulcrumed against the rear portion of the bottom 40 of the recess. The forward and downward slope of the bottom of the recess ensures that the latch link portion 50 will be fulcrumed only at its rear edge and provides a clearance for pivotal motion of the latch link about its fulcrumed rear edge.

The latch link is resiliently urged downwardly into the recess, thereby tending to pivot the latch link in a counterclockwise direction about its fulcrum, by rotating the thumb nut 62 in a direction that draws the bolt downwardly to compress the spring 68.

Arm 16 is substantially U-shaped, having a lower leg 70 and an upper leg 74 interconnected by a central or bight portion 76. A roller shaft 78 is fixed to the U-shaped arm 16 spanning the arm cavity between the upper leg 74 and the lower leg 70.

Extending forwardly from the lower edge of the body 10 are a pair of pivot ears 82, 84, positioned on either side of the roller shaft 78 and on either side of the lower leg 70 which is cut away to extend snugly between the pivot ears. A pivot pin 90 extends through ears 82, 84 through a groove in roller shaft 78, and through the lower leg 70 of arm 76. Pin 90 forms a pivot axis that pivotally mounts the arm 16 to the forward lower portion of the clip body 10 to enable the arm to be moved from a first position illustrated in solid lines in FIG. 3 to an open position illustrated in dotted lines in this figure. Mounted upon the shaft 78 is a roller 94 that is substantially double V-shaped in cross section, having flat end surfaces 98, 100 as best seen in FIG. 3. The forward end of the body 10 is curved rearwardly as at 96 to provide a space for receiving a fishing line.

Upper and lower parts of the curved forward end of the body are recessed to receive and overlie rear portions of the flat end surfaces of the roller. The lower recess has upwardly facing flat surface portions 102, 104 on the upper portions of pivot ears 82, 84 that are positioned close to the lower flat roller surface 100 when the arm 16 is in closed position. The upper recess has a pair of laterally spaced downwardly facing flat surface portions 106, 108 that are positioned closed to the flat upper surface 98 of the roller when the arm 16 is in closed position. The area between surfaces portions 106, 108 is relieved upwardly, as at 110, to enable the rearmost edge of the upper end of the roller to clear the closely mating body portions 106, 108 as the arm swings to and from its closed position.

The flat surface portions 102, 104, in closed arm position, extend laterally outwardly to form lower shrouds 112, 114 which, as can be seen in FIGS. 1 and 4, project over the roller bottom to and beyond the roller diameter that is parallel to arm pivot axis 90. Similarly flat surface portions 106, 108 extend laterally outwardly to form upper shrouds 118, 120 which, as can be seen in FIGS. 1 and 5, project over the roller top to and beyond the roller diameter that is parallel to arm pivot axis 90.

The upper and lower shrouds, including flat body surface protions 102, 104, 106, 108 provide an anti-jamming feature to prevent a fishing line from getting caught between the flat ends 98, 100 of the roller 94 and the respective legs 74, 70. It is possible that, as line tension varies during trolling, a line entrained over the roller and extending through the cavity will tend to ride up or down over the roller, moving axially of the roller in one direction or the other to the end of the roller. Without the described anti-jamming configuration, a line of small diameter or a line of compressible material could be forced over the roller end into the very small space between the roller end and the inner surfaces of one of the legs 70, 74. The shrouds, which overlie the roller ends and extend past the center of the roller, block entry of the line into such spaces and, therefore, prevent jamming of the line.

The upper leg 74 of arm 16 is provided with an upwardly and rearwardly opening arm recess 120 into which the upper end 122 of pin 78 projects by a small distance.

Latch link leg 52 has an end portion 124 which is upset to provide a downwardly facing arcuate ridge 126 that mates with the upper rounded end 122 of shaft 78 to provide an interengaging camming arrangement that releasably holds the arm in the closed position illustrated in solid lines in FIG. 3. The upper forward end of leg 74 is extended upwardly, as at 130, to provide a finger hold that facilitates opening of the clip.

An aperture 132 extends through the side of the body below the aperture 42 and into the bore 44 to enable visual observation of the lowermost end of the shank of bolt 58. The aperture is positioned and the bolt shank made to such a dimension that, with the bolt turned down into the thumb nut 62 so as to provide a compression force on spring 50 of a value intermediate expected minimum and maximum values of such compression, the end of the bolt is substantially at the midpoint of the aperture 132. Thus, visual observation of the bolt end at the midpoint of the viewing aperture 132 will provide an approximate indication of the amount of compression on the spring, and, thus, an indication of the amount of force required to move the arm from closed to open position.

The pivoted latch link 18 has its front end camming ridge 126 engaged with and pressed down against the upper end of the roller shaft when the arm is in the closed position illustrated in dotted lines. The latch link is pressed downwardly by the action of the bolt and spring with a force that is varied by rotation of the thumb nut 62. A fishing line extending through the cavity between the roller 94 and the body 10 has its ends substantially wrapped around the arm and extending forwardly of the arm when the clip is used in the conventional outrigger or downrigger arrangement. When a fish strikes, the line tension significantly increases, exerting a counterclockwise moment upon the roller 94 and the arm 76 which is sufficient to cause the rounded end of shaft 78 to cam itself out of the arcuate cam ridge 126 on the forward end of the latch link. The amount of line tension required to cam the shaft end away from the latch link is determined by the compression on the spring 50 as adjusted by nut 62. With the nut in adjusted position, the bolt head 60 has at least its lowermost edge confined within the rear and deeper portion of the body recess and thus the bolt is prevented from turning as the thumb wheel is adjusted. Preferably the latching mechanism, including link 18 and pivot pins 78, 90, and also the roller, adjusting nut, spring and bolt are made of wear resistent metal such as a stainless steel, for example, whereas the arm and body are made of plastic. Thus the latching cam means formed at the end of the latch link and at the end of the roller shaft are provided by hard wearing metallic components. Link stop 38 limits the downward motion of the latch link leg 52 to ensure optimum interengagement of the arcuate ridge 126 and the shaft end 122.

The pivot pin 90, positioned to intersect the axial roller shaft 78, provides a sturdier more compact packaging. The pin not only provides for pivotal motion of the arm 16 but also locks the roller shaft in place by extending through the shaft groove. The roller shaft not only provides a journal for the roller but also operates as one of the camming members for the latching of the pivoting arm.

With the thumb nut captured within the aperture and spring 68 interposed between the bottom wall 50 of the recess and the bolt head 60, the thumb nut 62 can be turned with relatively little drag because it does not bear against the spring 68 but bears only against the relatively smooth low friction plastic surface of the clip body within the rectangular aperture 42.

The foregoing detailed description is to be clearly understood as given by way of illustration and example only, the spirit and scope of this invention being limited solely by the appended claims.

What is claimed is:

1. A releasable roller clip comprising
a body,
an elongated roller journaled to said body about a roller axis extending in a first direction,
means for pivotally connecting said roller at one end thereof to said body for motion about a pivot axis angulated relative to said roller axis between a first position in which a roller surface is adjacent to but spaced from said body and a second position in which said roller is pivoted away from said body,
means for resting motion of said roller from said first position with a predetermined amount of resistive force,
means for preventing a fishing line entrained over said roller from moving past the end of the roller, thereby preventing such fishing line from being caught between the end of the roller and said means for pivotally connecting, and
means for connecting said body to a support,
said means for pivotally connecting comprising an arm pivoted to said body, said roller being journaled on said arm, said means for preventing a fishing line from moving past the end comprising shroud means on said body overlying at least one end of the roller in said first position, and extending from said body to the roller diameter that is parallel to said pivot axis.

2. A releasable roller clip comprising
a body,
an elongated roller journaled to said body about a roller axis extending in a first direction,
means for pivotally connecting said roller at one end thereof to said body for motion about a pivot axis angulated relative to said roller axis between a first position in which a roller surface is adjacent to but spaced from said body and a second position in which said roller is pivoted away from said body,
means for resisting motion of said roller from said first position with a predetermined amount of resistive force,
means for preventing a fishing line entrained over said roller from moving past the end of the roller, thereby preventing such fishing line from being caught between the end of the roller and said means for pivotally connecting, and
means for connecting said body to a support,
said means for pivotally mounting comprising a U-shaped arm having first and second end sections interconnected by a bight section, said roller being journaled at its opposite ends in said arm end sections and having end surfaces adjacent said arm end sections, said means for preventing a fishing line from moving past the end comprising shroud means extending from said body to a diameter of at least one of said end surfaces that is parallel to said pivot axis, said shroud means overlying said one roller end surface in said first position.

3. A releasable roller clip for holding a fishing line comprising
a clip body,
means on the body for securing it to a support,
a releasable arm pivoted to said body for motion between a first position in which a portion of said arm adjacent said body is spaced from the body to define a line receiving cavity closed at opposite ends of said arm, and a second position in which one end of said arm is away from said body,
a roller journaled to said arm and defining a small space between the roller and ends of said arm, said roller having a surface in said cavity spaced from said body, whereby the force exerted by a tensioned line extending over said roller through said cavity tends to pivot said arm and roller away from said body,
shroud means for preventing a line extending over said roller and through said cavity from moving over an end of the roller into said space, and
means for retaining said arm in said first position.

4. The releasable roller clip of claim 3 wherein said shroud means comprises an extension on said body overlying ends of the roller adjacent said arms ends when in said first position.

5. The releasable clip of claim 3 wherein said arm is pivoted to said body about a pivot axis, and wherein said shroud means comprises an extension on both sides of said body projecting over said roller ends in said first position to a diameter of said roller ends that is parallel to said pivot axis.

6. The clip of claim 5 wherein said extensions extend from said body and across said cavity laterally outwardly beyond the maximum dimensions of said roller in a direction perpendicular to said pivot axis of said roller.

* * * * *

UNITED STATES PATENT AND TRADEMARK OFFICE
CERTIFICATE OF CORRECTION

PATENT NO. : 4,574,518

DATED : Mar. 11, 1986

INVENTOR(S) : William D. Shedd et al.

It is certified that error appears in the above-identified patent and that said Letters Patent is hereby corrected as shown below:

Claim 1 (column 5, line 51), delete "resting" and substitute therefor ---resisting---.

Signed and Sealed this

Seventh Day of April, 1987

Attest:

DONALD J. QUIGG

*Attesting Officer*  *Commissioner of Patents and Trademarks*